(12) United States Patent
Müller

(10) Patent No.: US 7,350,355 B2
(45) Date of Patent: Apr. 1, 2008

(54) HYDRAULIC SYSTEM HAVING AT LEAST ONE HYDRAULIC VALVE FOR CONTROLLING A TRANSMISSION

(75) Inventor: Eric Müller, Kaiserslautern (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 11/303,874

(22) Filed: Dec. 17, 2005

(65) Prior Publication Data

US 2006/0156915 A1 Jul. 20, 2006

(30) Foreign Application Priority Data

Dec. 18, 2004 (DE) ...................... 10 2004 060 988

(51) Int. Cl.
*F16D 39/00* (2006.01)
*F15B 13/04* (2006.01)

(52) U.S. Cl. .......................... 60/488; 91/461

(58) Field of Classification Search ................. 91/305, 91/306, 461; 60/464, 488
See application file for complete search history.

(56) References Cited

U.S. PATENT DOCUMENTS

| | | | | |
|---|---|---|---|---|
| 4,316,486 A | * | 2/1982 | Tandrup et al. ................ | 91/461 |
| 4,372,193 A | * | 2/1983 | Hall ............................ | 91/461 |
| 5,419,130 A | * | 5/1995 | Ruckgauer et al. ........... | 60/488 |

* cited by examiner

*Primary Examiner*—Michael Leslie
(74) *Attorney, Agent, or Firm*—Alfred J. Mangels

(57) ABSTRACT

A hydraulic system having at least one hydraulic valve for controlling a transmission, in particular a continuously variable transmission. The hydraulic valve is controlled by a pilot circuit including at least one control element having a variable flow resistance and one control element having a constant flow resistance. The control element having a variable flow resistance is connected upstream of the control element having a constant flow resistance.

4 Claims, 1 Drawing Sheet

HYDRAULIC SYSTEM HAVING AT LEAST ONE HYDRAULIC VALVE FOR CONTROLLING A TRANSMISSION

BACKGROUND OF THE INVENTION

1. Field of the Invention

The present invention concerns a hydraulic system having at least one hydraulic valve for controlling a transmission, in particular a continuously variable transmission, wherein the hydraulic valve can be controlled by a pilot circuit having at least one control element having a variable flow resistance and one control element having a constant flow resistance.

2. Description of the Related Art

A hydraulic system of that sort is adequately known from motor vehicle technology. Preferably, the hydraulic system can be used to control the control components of a continuously variable transmission, which is also called a CVT transmission.

For example, with the known hydraulic system a control element having a constant flow resistance and a control element having a variable flow resistance are used in the pilot circuit. The pilot circuit is pressurized by a supply source with a predetermined supply pressure. The supply pressure acts first on the control element having a constant flow resistance, with the control element having a variable flow resistance being connected in series with the control element having a constant flow resistance in the flow direction. The two flow resistances of the control elements thereby form a pressure divider. A control pressure conduit is connected to the connecting conduit between the control element having a constant flow resistance and the control element having a variable flow resistance, which pressurizes the hydraulic valve with a desired control pressure.

When controlling the CVT transmission, control elements with rising characteristic curves are usually used. For a variety of reasons, such as safety aspects, for example, it can be simpler and can create fewer complications if a control element having a falling characteristic curve is installed in the hydraulic system. That results in the disadvantage that it is not possible to employ the usual components, namely control elements having rising characteristic curves.

An object of the present invention is to provide a hydraulic system of the type described above, in which a falling characteristic curve is implemented and without a control element having a falling characteristic curve being utilized.

SUMMARY OF THE INVENTION

In accordance with the present invention, that object is achieved by a hydraulic system having at least one hydraulic valve for controlling a transmission, in particular a continuously variable transmission, wherein the hydraulic valve is controlled by a pilot circuit including at least one control element having a variable flow resistance and one control element having a constant flow resistance, and where, in accordance with the invention, the control element having a variable flow resistance is connected upstream of the control element having a constant flow resistance.

Accordingly, through the type of interconnection in accordance with the invention, a falling characteristic curve is achieved in the hydraulic valve to control a transmission, but a control element having a rising characteristic curve is used. Thus a cost reduction is achieved through the use of like components, since as a rule control elements with rising characteristic curves are employed in that application.

In the case of the present invention, an advantageous embodiment provides that a proportional valve with a rising characteristic curve be used as a control element having a variable flow resistance. It is also conceivable, however, that other valves or similar components can be utilized as control elements, which achieve a similar or identical function as a proportional valve with a rising characteristic curve.

Preferably, in accordance with a further refinement of the present invention, a fixed orifice plate, or the like, is utilized as a control element having a constant flow resistance. Here, also, the possibility of using other components with a similar or identical function exists. The diameter of the orifice plate used can be, for example, 0.8 mm. Other dimensions are also conceivable.

In accordance with a refinement of the invention, the control element having a constant flow resistance can be connected to a leakage tank. Thus, when controlling the desired control pressure, any leakage flow that results can be conducted away to the leakage tank.

With the application of the hydraulic system in accordance with the invention provided herein for controlling a CVT transmission, the pilot circuit can preferably be pressurized with a constant pressure of about 5 bar. However, other supply pressures are also possible.

The chosen supply pressure results in a possible control pressure between 0 and 5 bar.

When using a proportional valve with a rising characteristic curve as a control element having a variable flow resistance, and a fixed orifice plate as a control element having a constant flow resistance, it is possible to increase the hydraulic flow resistance to a maximum when flow is occurring in the proportional valve that is in the form of an electromagnetic valve, the result of which is that the controlling control pressure is low or takes the value 0 when the proportional valve is completely closed.

On the other hand, when there is no flow in the proportional valve, a control pressure which corresponds to the supply pressure can be present at the hydraulic valve. In that way, in spite of the use of a proportional valve with a rising characteristic curve, a falling characteristic curve of the hydraulic valve is possible in order to actuate transmission components accordingly.

BRIEF DESCRIPTION OF THE DRAWING

The structure, operation, and advantages of the present invention will become further apparent upon consideration of the following description, taken in conjunction with the accompanying drawing in which.

DESCRIPTION OF THE PREFERRED EMBODIMENTS

Figure 1:
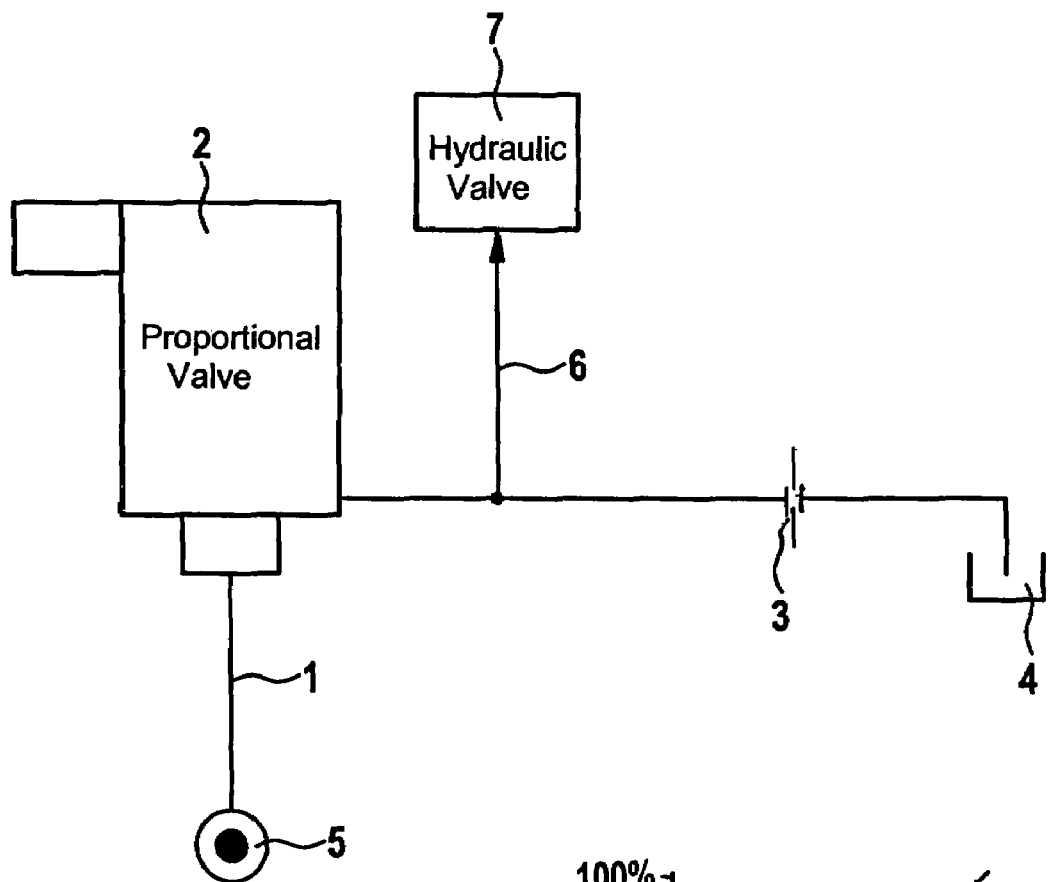
FIG. 1 shows a schematic view of the circuit of the control elements in the pilot circuit for controlling a hydraulic valve in accordance with the inventive hydraulic system.

The proposed hydraulic system shown in FIG. 1 includes a pilot circuit 1. The pilot circuit 1 has two control elements, one control element having a variable flow resistance and designed as a proportional valve 2, which is operated electromagnetically. In addition, pilot circuit 1 includes as a control element having a constant flow resistance a fixed orifice plate 3, which is connected to a leakage tank 4.

Figure 2:
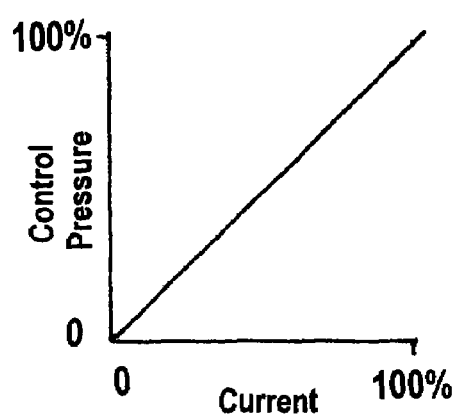
FIG. 2 shows a rising characteristic curve of a control element.

Proportional valve 2 is an electrically-operated valve having a rising characteristic curve, as shown in FIG. 2, and is pressurized by a supply source 5 with a constant supply pressure of e.g. 5 bar. A control pressure line 6 branches off from the connecting line between proportional valve 2 and fixed orifice plate 3. The control pressure line pressurizes a hydraulic valve 7 with the particular control pressure desired. The control pressure can be between 0 and 5 bar in that exemplary embodiment. Hydraulic valve 7 serves to control a transmission (not shown), in particular a CVT transmission.

The fixed orifice plate has a diameter of about 0.8 mm in that exemplary embodiment. The hydraulic valve to be controlled is connected between the two control elements, and ideally has no leakage.

When there is a flow through proportional valve 2, the hydraulic flow resistance becomes very large, since the electromagnetically operated proportional valve 2 is moved toward the closed direction by flow. Because of the increasing hydraulic flow resistance, the control pressure is reduced until ultimately there is no longer any pressure at the hydraulic valve and the control pressure corresponds to zero bar.

When there is no flow through proportional valve 2, the hydraulic flow resistance is correspondingly small, since proportional valve 2 is opened or is already open. As a result, the control pressure rises until a pressure of 5 bar is reached, if the proportional valve is fully open.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A hydraulic system having at least one hydraulic valve for controlling a transmission, said hydraulic system comprising: a hydraulic valve that is actuated through a pilot circuit including at least one control element having a variable flow resistance and one control element having a constant flow resistance, wherein the at least one control element having a variable flow resistance is an electrically-controlled proportional valve having a rising characteristic curve and is connected upstream of the control element having a constant flow resistance, wherein the control element having a constant flow resistance is connected to a leakage tank, and wherein the hydraulic valve is connected by a control pressure line with a pilot pressure circuit at a point between the at least one control element having a variable flow resistance and the control element having a constant flow resistance.

2. A hydraulic system in accordance with claim 1, wherein the control element having a constant flow resistance is a fixed orifice plate.

3. A hydraulic system in accordance with claim 2, wherein the fixed orifice plate has a diameter of about 0.8 mm.

4. A hydraulic system in accordance with claim 1, wherein the pilot circuit is pressurized at a constant pressure of about 5 bar.

* * * * *